J. A. COOK.
Steam Piston-Meter.

No. 216,833.  Patented June 24, 1879.

WITNESSES:
Francis McArdle,
C. Sedgwick

INVENTOR:
J. A. Cook
BY Munn & Co
ATTORNEYS.

UNITED STATES PATENT OFFICE.

JOSEPH A. COOK, OF AUBURN, NEW YORK.

IMPROVEMENT IN STEAM-PISTON METERS.

Specification forming part of Letters Patent No. 216,833, dated June 24, 1879; application filed December 17, 1878.

*To all whom it may concern:*

Be it known that I, JOSEPH A. COOK, of Auburn, in the county of Cayuga and State of New York, have invented a new and Improved Steam-Meter, of which the following is a specification.

This invention relates to a device for measuring the amount of steam consumed for heating purposes in houses, stores, &c.; and the object thereof is to determine the amount consumed by measuring the condensed water flowing from the registers or coils and recording the same on a dial.

It consists of a reservoir for receiving the water, in which is a float operated by the water, which by its movements up and down operates a pair of arms fixed to a shaft carrying a pawl, which engages a ratchet on a shaft that actuates a pointer on a dial, also operating at the same time a valve to shut off the entrance of the water from the return or discharge pipe from the coils or registers, and a valve for opening the waste-pipe, all operating together as hereinafter fully described.

Figure 1:
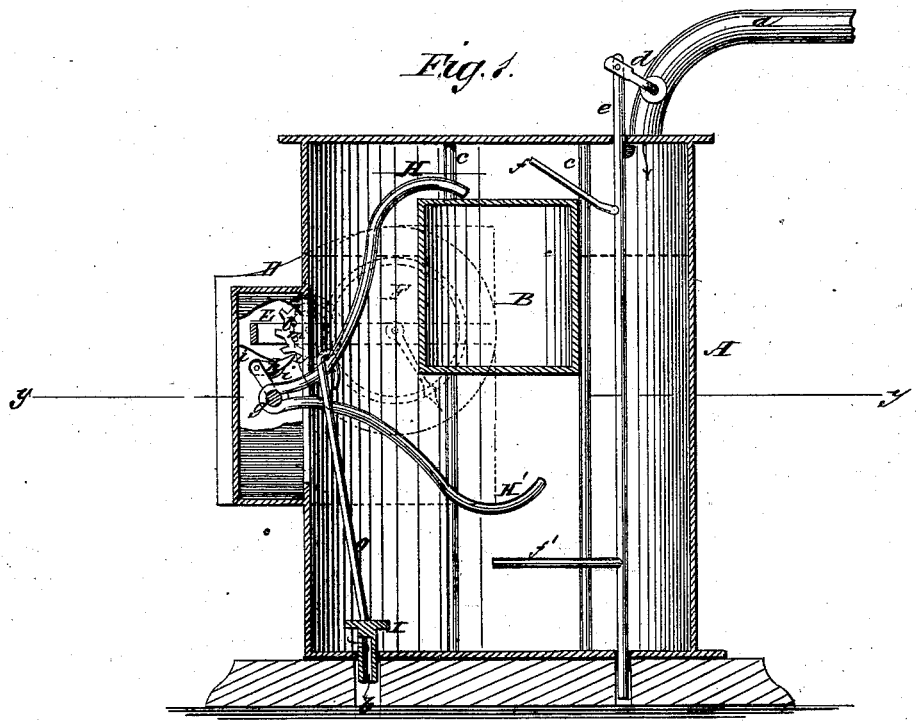
Figure 2:
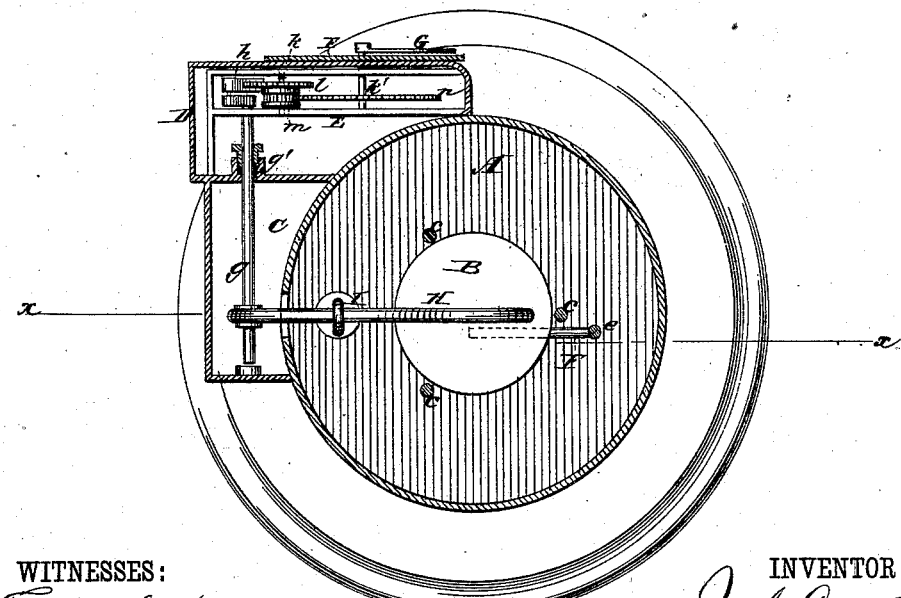

In the accompanying drawings, Figure 1 is a vertical section of my improvement on line $x\ x$, Fig. 2; and Fig. 2 is a cross-section on line $y\ y$, Fig. 1.

Similar letters of reference indicate corresponding parts.

Referring to the drawings, A represents a metal reservoir, circular in form, and closed in tightly at top and bottom. This reservoir is connected with the register or coil by the condensed-water-return pipe $a$, and at the bottom is a port, $b$, from which a pipe may lead to a trap for delivering the water back into the boiler, or it may be simply a waste-pipe.

In the reservoir is placed a float, B, confined in the vertical guide-rods $c\ c\ c$, in such a way, however, as to move freely up and down.

In pipe $a$ is a valve with an arm, $d$, the end whereof is pivoted to the end of a rod, $e$, held in a vertical position in the reservoir, so as to play up and down. From this rod project toward the float arms $f f'$, the first above the float and the other below it, and sufficiently far apart to allow a limited movement to the float, but so arranged that when the float moves upward a certain distance it strikes arm $f$, and, moving it upward, closes the valve in pipe $a$, and when moved downward it strikes arm $f'$, and, throwing it down, causes the rod to open said valve.

On the opposite side of the reservoir is a water-tight chamber, C. In this chamber is journaled horizontally a shaft, $g$, one end projecting through a stuffing-box, $g'$, in one side of the chamber, and terminating in a crank, to which is pivoted a pawl, $h$, controlled by springs $i\ i$.

In a casing, D, joined to the reservoir and the chamber, is supported a frame, E, in which are journaled two pivots, $k\ k'$. On the former is a ratchet-wheel, $l$, engaging pawl $h$, and adjacent to it a pinion, $m$, meshing with spur-wheel $n$, fixed to shaft $k'$. Shaft $k'$ projects through the casing D, and through a dial, F, fixed thereto, and on its projecting end is placed a pointer, G. By the oscillations of shaft $g$ the pawl is caused to actuate ratchet $l$, and then through the gearing the pointer G is moved around the face of the dial.

On shaft $g$, in the chamber C, are fixed two arms, H H', which project through a vertical slot in the casing of the reservoir, and in line with the vertical movement of the float B, one arm, H, being above the float, and H' below it, whereby when the float is carried up the arms are elevated, thus turning the shaft $g$ in one direction, and when it falls it operates to turn it back the same distance. Thus its two movements oscillate it the same distance every time.

From the arm H depends a rod, $o$, its lower end attached to a valve, I, seated in the port $b$, so that when the arms are elevated this valve opens the port, and when lowered it closes it.

The operation of my improvement is as follows: The reservoir is adapted to receive so many gallons of water before the measuring mechanism is operated. For this purpose the float is adjusted to be borne up only after the fixed number of gallons of condensed water has flowed into the reservoir. When this number has been reached the float is borne up, and in its course it strikes the arm $f$, operating rod $e$, and closes the valve in pipe $a$, also arm H, oscillating the shaft and drawing the pawl back ready to engage a tooth of the ratchet-wheel, and, lastly, drawing up rod $o$, raises the valve I and opens the waste-port.

The pipe $a$ being closed, the water from the coils is shut off until what is in the reservoir passes off through port $b$.

As the water flows off, the float sinks, and, striking the arm H′, oscillates the shaft, throwing the pawl forward. This moves the gearing and causes the hand on the dial to move one step, thus indicating that so many gallons of water have passed through the reservoir. It also strikes the arm $f'$, lowering rod $e$ and opening the valve in pipe $a$, and at the same time the valve I is lowered to close the port $b$, thus adapting the device to receive and measure again.

The relative distance to be traveled by the rods $o$ and $e$ to open and close alternately their respective valves must be nicely adjusted, so that at the instant the valve in pipe $a$ is closed valve I will be lifted to open port $b$, and vice versa.

The valve-rod $o$ may be pivoted to an arm on shaft $g$, so as to actuate the valve from the outside, if it is desirable to do so.

The dial, as before intimated, registers the amount of condensed water delivered from the registers or coils; but from this the quantity of steam consumed must be deduced.

The apparatus is perfectly practicable as a water-meter for measuring the quantity of water consumed.

Having thus described my invention, I claim as new and desire to secure by Letters Patent—

1. The rock-shaft $g$, connected by a pawl with the ratchet of registering mechanism, and provided with arms H H′, arranged one above and the other below a vertically-movable float, as and for the purpose set forth.

2. The arms H H′, arranged with respect to float, connected with the drive-shaft of registering mechanism, and attached to the lift rod or stem of the water-discharge valve, as and for the purpose specified.

3. The combination and arrangement of the following elements, to wit: the reservoir A, connected with pipe $a$, leading from the coils or registers, the float B, rod $e$, connected with valve of pipe $a$, and provided with arms $f f'$, to be engaged by the float for opening and closing the valve, the arms H H′, connected with the registering mechanism, the rod $o$, and valve I, for opening and closing port $b$, substantially as described.

JOSEPH A. COOK.

Witnesses:
S. L. BRADLEY,
G. B. LONGSTREET.